United States Patent
Kawakami et al.

(10) Patent No.: US 7,957,896 B2
(45) Date of Patent: *Jun. 7, 2011

(54) VEHICULAR DISPLAY SYSTEM AND METHOD

(75) Inventors: Hidehiko Kawakami, Nagoya (JP); Tetsuya Enokizaka, Nagoya (JP); Akihiro Watanabe, Kariya (JP); Tsuneo Uchida, Okazaki (JP); Kiyotaka Taguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 978 days.

This patent is subject to a terminal disclaimer.

(21) Appl. No.: 11/526,617

(22) Filed: Sep. 26, 2006

(65) Prior Publication Data

US 2007/0150187 A1 Jun. 28, 2007

(30) Foreign Application Priority Data

Sep. 27, 2005 (JP) ................................. 2005-280577

(51) Int. Cl.
*G01C 21/30* (2006.01)
(52) U.S. Cl. ................... 701/211; 340/995.14; 701/200; 701/208
(58) Field of Classification Search ............... 701/1, 36, 701/211, 200, 208, 212; 340/995.1, 995.12–995.15, 340/995.27, 461; 345/7
See application file for complete search history.

(56) References Cited

U.S. PATENT DOCUMENTS

| 4,812,980 A | 3/1989 | Yamada et al. |
| 5,764,139 A | 6/1998 | Nojima et al. |
| 2003/0046000 A1 | 3/2003 | Morita et al. |
| 2007/0055442 A1 * | 3/2007 | Kawakami et al. ........... 701/208 |

FOREIGN PATENT DOCUMENTS

| DE | 19947506 A1 | | 4/2001 |
| JP | A-09-123848 | * | 1/1997 |
| JP | 10-221092 A | | 8/1998 |
| JP | A-11-51686 | | 2/1999 |
| JP | 2000-285119 A | | 10/2000 |
| JP | A-2002-286482 | * | 1/2002 |

OTHER PUBLICATIONS

U.S. Appl. No. 11/515,030, filed Sep. 6, 2006, Kawakami et al.
Office Action dated Sep. 3, 2010 issued from the Japan Patent Office for corresponding patent application No. 2005-280577 (English translation enclosed).

* cited by examiner

*Primary Examiner* — Gertrude Arthur Jeanglaud
(74) *Attorney, Agent, or Firm* — Posz Law Group, PLC

(57) ABSTRACT

A vehicular display system includes an in-vehicle navigation device and a vehicular meter device. The in-vehicle navigation device includes a display, a navigation data producing device for producing first data that is to be displayed on the display, and a transmitting device for transmitting intermediate data to the vehicular meter device. The vehicular meter device includes a receiving device for receiving the intermediate data from the in-vehicle navigation device and a navigation data display area for displaying second data. A display size changing device for changing the first data into the second data is included in at least one of the in-vehicle navigation device and the vehicular meter device. A display size of the first data is different from the display size of the second data.

17 Claims, 6 Drawing Sheets

| ID | ITEM | SIZE |
|---|---|---|
| 0001 | NORMAL MAP DISPLAY | SMALL |
| 0002 | MENU SCREEN | LARGE |
| 0003 | DOUBLE-SCREEN MODE | MEDIUM |
| 0004 | INTERSECTION ENLARGED VIEW | LARGE |
| 0005 | FREEWAY MODE | SMALL |

VEHICULAR DISPLAY SYSTEM AND METHOD

CROSS REFERENCE TO RELATED APPLICATION

This application is based on and incorporates herein by reference Japanese Patent Application No. 2005-280577 filed on Sep. 27, 2005.

FIELD OF THE INVENTION

The present invention relates to a vehicular display system.

BACKGROUND OF THE INVENTION

Recently, besides a conventional mechanical meter, an image display device using a liquid crystal panel or the like, is employed as a display device for a vehicular meter panel. The image display device has an advantage of fully controlling a setting of a display design and a layout.

In addition to the conventional mechanical meter, this image display device displays a screen of an in-vehicle navigation device. Besides, a route guidance device, which switches two modes (between a stop mode and a drive mode) according to a speed of a vehicle, has been proposed (JP11-051686A). In the stop mode, information required when the vehicle stops is displayed on a small screen of a liquid crystal display (LCD) display device. In the drive mode, information required when the vehicle is traveling is displayed on a large screen of the LCD display device. On the other hand, a map, the vehicle's own location, and a navigation guidance image including a guidepath while guiding a driver, are displayed on the small screen in the drive mode.

In a map display device in JP11-051686A, the navigation guidance image is displayed on a meter display. However, the map display device does not operate in coordination with a meter ECU that controls the meter display. Thus, the LCD display device of the meter display is not utilized effectively. Moreover, since the images are switched according to the speed of the vehicle, information that a user demands may not be displayed.

Furthermore, the user normally remembers 'which information is displayed on which area of a display screen'. Consequently, when the user wants to know the speed of the vehicle, for example, he/she tends to 'look at an area of the display screen, on which a speedometer is displayed' instead of 'looking for the speedometer'. Hence, switching the screen displays according to the speed of the vehicle may not allow the user to readily obtain required information, because it may take him/her a long time to 'look for the speedometer'.

SUMMARY OF THE INVENTION

The present invention addresses the above disadvantages. Thus, it is an objective of the present invention to provide a vehicular display system and method, which provides map information and the like, which are easy to read for a user.

To achieve the objective, there is provided a vehicular display system, which includes an in-vehicle navigation device and a vehicular meter device. The in-vehicle navigation device includes a display for displaying first data. The navigation device produces the first data that is to be displayed on the display, and transmits intermediate data to the vehicular meter device. The vehicular meter device receives the intermediate data from the in-vehicle navigation device. The meter device includes a navigation data display area for displaying second data. A display size changing for changing the first data into the second data is performed by at least one of the in-vehicle navigation device and the vehicular meter device. A display size of the first data is different from the display size of the second data.

There is also provided a vehicular meter device, which receives first data from an output medium. The meter device changes the first data into second data. The meter device includes a navigation data display area for displaying the second data. The second data is displayed with a different size from the first data in the navigation data display area.

There is further provided a method for displaying travel guidance information in a vehicle that has a navigation system and a meter display device. The method includes producing first data in the navigation system, changing the produced first data into second data, a display size of which is different from the display size of the first data, and displaying the travel guidance information in the meter display device based on the second data.

BRIEF DESCRIPTION OF THE DRAWINGS

The invention, together with additional objectives, features and advantages thereof, will be best understood from the following description, the appended claims and the accompanying drawings. In the drawings:

DETAILED DESCRIPTION OF THE EMBODIMENT

Figure 1:
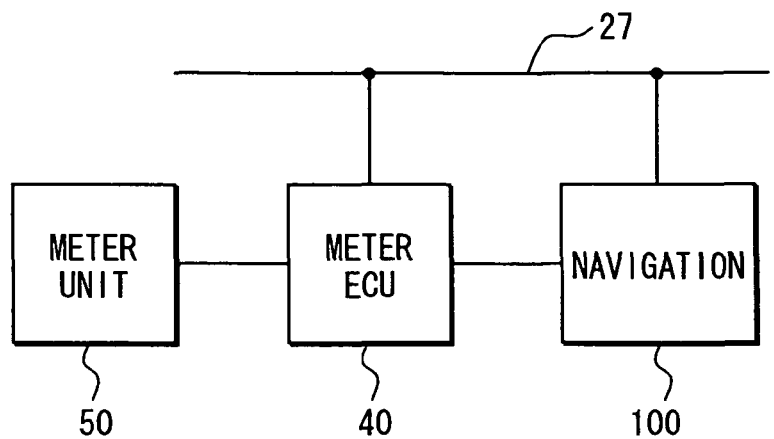
FIG. 1 is a block diagram showing a vehicular display system according to an embodiment of the present invention.

With reference to FIG. 1, a vehicular display system includes a meter ECU 40, a meter unit 50, and an in-vehicle navigation device 100. The meter ECU 40 and the navigation device 100 are connected by an in-vehicle local area network (LAN) 27. Alternatively to the in-vehicle LAN 27, a dedicated cable may be employed in transmitting data according to contents of the data.

Figure 2:
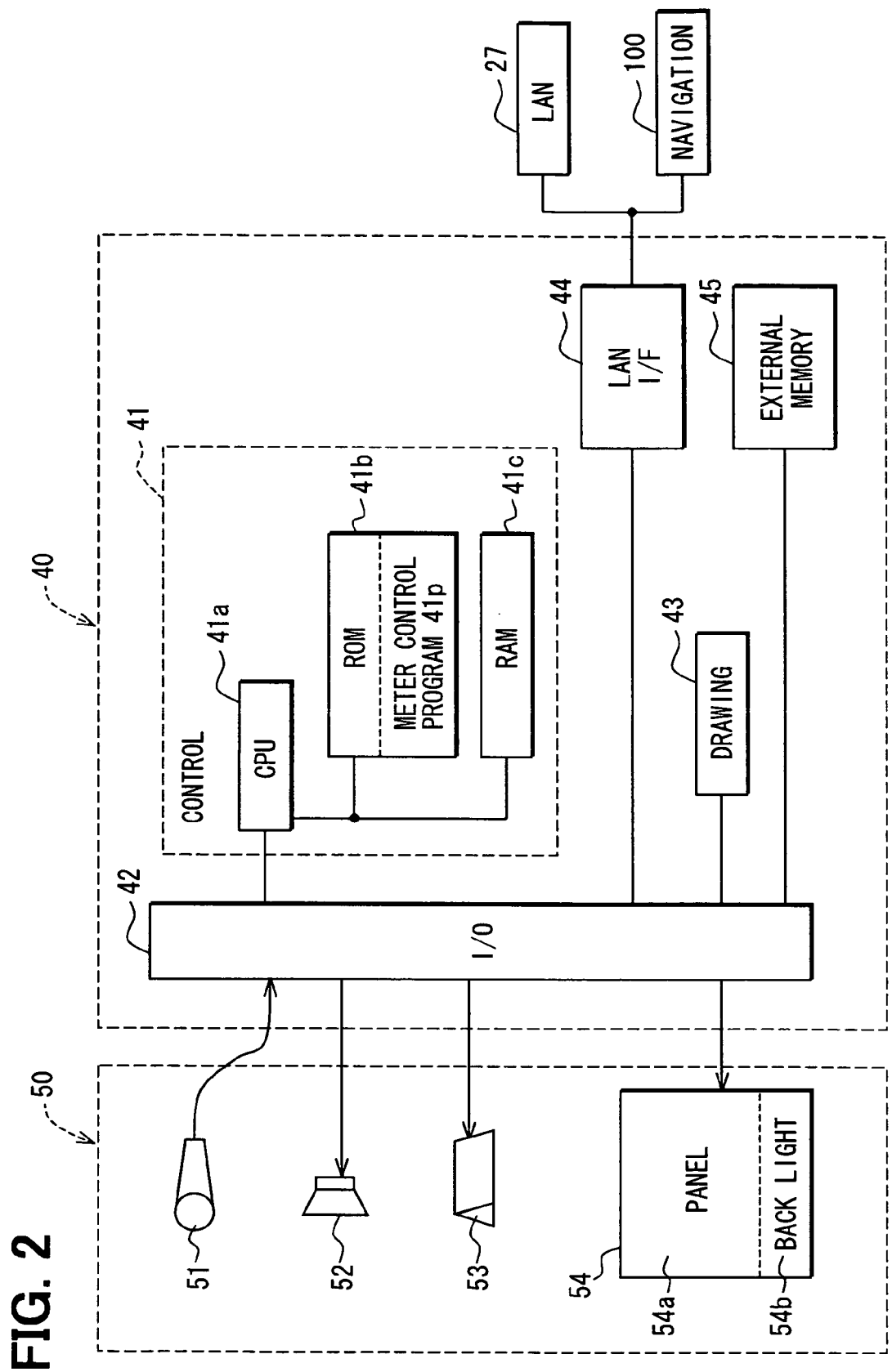
FIG. 2 is a block diagram showing a meter ECU and a meter in the embodiment.

As shown in detail in FIG. 2, the meter ECU 40 includes a control part 41, an I/O 42, a drawing part 43, a LAN I/F 44, and an external memory 45. The drawing part 43, the LAN I/F 44, and the external memory 45 are connected to the control part 41 through the I/O 42.

The control part 41 includes a CPU 41a, a ROM 41b, a RAM 41c, and a peripheral circuitry (not shown) such as an A/D converter, all of which are well known. The ROM 41b stores various data and a meter control program 41p that is used for executing various types of processing, which is performed by the meter ECU 40.

A meter display size changing part in the present embodiment, namely, the drawing part 43, produces meter display data used for a display in the meter unit 50 based on data required for a meter display, which are obtained from, for example, the in-vehicle LAN 27. Also, the drawing part 43 stores data used for the display and for a display color. The data to be obtained is on, for instance, engine water temperature, an engine rotation speed, a vehicle speed, a shift position, a mileage, a date and time, and a residual fuel.

The LAN I/F 44 exchanges the data with the in-vehicle LAN 27.

The external memory 45, which is for storing a display size, includes an electrically erasable and programmable read only memory (EEPROM) and a rewritable semiconductor memory such as a flash memory. The external memory 45 stores information and data required for an operation of the meter ECU 40. In addition, the external memory 45 is designed to retain memory contents even though the meter ECU 40 falls into an off-state.

The meter unit 50 includes a microphone 51, a speaker 52, an LED 53, and a display device 54. The meter unit 50 displays an image defined by the meter display data, which has been produced by the meter ECU 40.

The microphone 51 is used, for example, as a part of a voice input device of the navigation device 100. Instead of using the in-vehicle LAN 27, voice data that are inputted into the microphone 51 may be transmitted directly to the navigation device 100.

Figure 4:
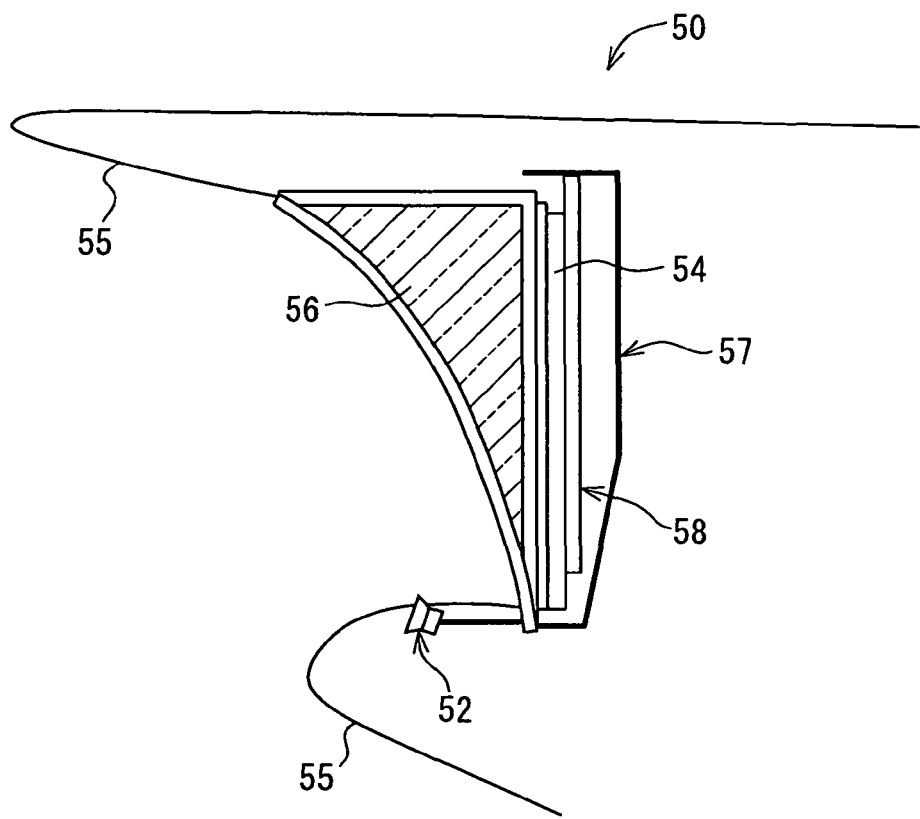
FIG. 4 is a cross-sectional view of a meter panel in the embodiment.

The speaker 52 transmits a voice message from various types of in-vehicle equipment. As well, the speaker 52 transmits the voice message of the navigation device 100. Additionally, the speaker 52 and the navigation device 100 may be directly connected instead of the use of the in-vehicle LAN 27. As shown in FIG. 4, the speaker 52 may be installed close to a lens 56 in a meter hood 55.

The LED 53 is used mainly, for instance, as a direction indicator lamp, an operation monitor lamp and a warning lamp.

The display device 54 includes a panel 54a (e.g., a well-known color LCD), a back light 54b, and a driver circuit (not shown) to control the liquid crystal display. An active matrix drive system, for example, may be employed for the driver circuit. The active matrix drive system allows ensuring that a target pixel is lit or extinguished by applying a transistor to each pixel. The display is performed by the driver circuit based on a drawing command and the drawing data (i.e., the meter display data) that are transmitted from the meter ECU 40. Alternatively, an organic electroluminescence (EL) indicator or a plasma indicator may be substituted for the display device 54.

The meter unit 50 may be constructed as shown in FIG. 4. The display device 54, a meter board 58 (which includes the driver circuit and the like), the LED 53 (not shown) and the like are received in a case 57, which is attached to a predetermined position of a dash panel. Upper and lower parts of the case 57 are covered with a meter hood 55 to improve visibility of the meter unit 50, as a result of reducing mainly reflection and glare of light. A lens 56 is attached to a front side of the display device 54 so that a driver can easily read the display indicated at an appropriate magnification.

Figure 3:
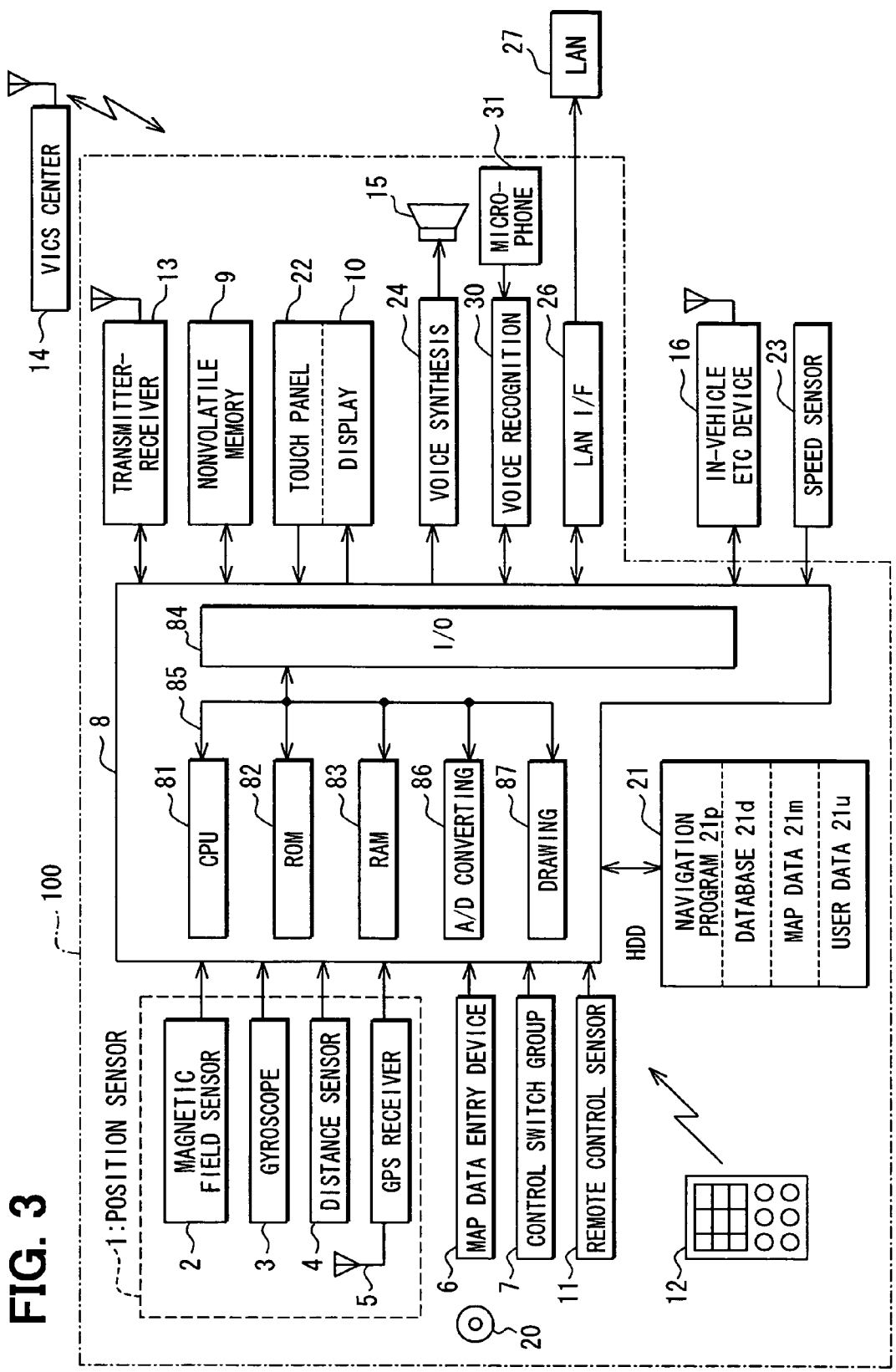
FIG. 3 is a block diagram showing an in-vehicle navigation device in the embodiment.

The navigation device 100 includes, as shown in FIG. 3, a position sensor 1, a map data entry device 6, a control switch group 7, a remote control sensor 11, a voice synthesis circuit 24 and a speaker 15 that provide an audio assist, a nonvolatile memory 9, a display device 10, a hard disk device (HDD) 21, a control circuit 8 that is connected to the above elements, and a remote control terminal 12.

The position sensor 1 includes a magnetic field sensor 2, a gyroscope 3, a distance sensor 4, and a GPS receiver 5, all of which are well known. The GPS receiver 5 detects a position of a vehicle based on a radio wave from a satellite. Since these elements 2, 3, 4, 5 have errors with their properties different from each other, the elements 2, 3, 4, 5 are configured such that a plurality of the sensors complement one another. In addition, depending on accuracy, a part of the above sensors may constitute the position sensor 1. Furthermore, a rotation sensor of a steering, and a wheel sensor of each rolling wheel (e.g., a speed sensor 23) may be employed for constituting the position sensor 1.

A touch panel 22 integrated with the display device 10, or a mechanical switch, for instance, may be employed for the control switch group 7. An electric circuit of the touch panel 22, which includes a transparent film and a glass substrate, is wired in directions of an X-axis and a Y-axis. The transparent film is placed on the glass substrate, which is in turn placed on a screen of the display device 10, with a gap provided by a spacer disposed between the transparent film and the glass substrate. When the user touches the transparent film, a part of a wiring that is being pressed by the user short-circuits, thereby changing a voltage. A known resistive method is widely used for detecting this voltage as a two-dimensional coordinate (X, Y). Alternatively, a known capacitive method may be employed for detecting a change of a capacitance as an electronic signal by a sensor, when a finger is brought close to a glass surface of a transparent conductive substrate, to which a substance that receives the electronic signal is applied. Besides the mechanical switch, a pointing device such as a mouse or a cursor may be alternatively used.

Using a microphone 31 and a voice recognition unit 30, various commands can be inputted. The voice recognition unit 30 processes a sound signal that has been inputted from the microphone 31 by means of voice recognition technologies such as a well-known hidden Markov model. Then the sound signal is converted into an operation command according to a result of the processing. These input operating means in the present embodiment, that is, the control switch group 7, the remote control terminal 12, and the microphone 31 allow the various commands to be inputted. In addition, the microphone 51 of the meter unit 50 may be employed as an alternative.

An external information obtaining part in the present embodiment, namely, a transmitter-receiver 13, is a device for receiving vehicle information (road traffic information), for example, from a vehicle information and communication system (VICS) center 14.

Furthermore, by communicating with an in-vehicle electronic toll collection (ETC) device 16, toll information or the like, which the in-vehicle ETC device 16 receives from an on-street ETC device (not shown), can be included in the navigation device 100. Alternatively, the transmitter-receiver 13 may communicate with the VICS center 14 by connecting the in-vehicle ETC device 16 to an external network.

An input operation detecting means in the present embodiment, namely, the control circuit 8 is configured as a normal computer. The control circuit 8 includes a CPU 81, a ROM 82, a RAM 83, an input/output circuit (I/O) 84, and a bus line 85 that connects the above elements to each other. The CPU 81 performs control, using data and a navigation program 21p that are stored in a HDD 21. The CPU 81 has read-write control of the data over the HDD 21. An A/D converting part 86 includes a well-known analog/digital (A/D) converter. The A/D converting part 86 converts, for example, analog data, which has been inputted into the control circuit 8 from the position sensor 1 and the like, into digital data that allows an operation in the CPU 81. In addition, the ROM 82 may store a program for a minimally necessary operation in case of a failure of the HDD 21, among navigation functions.

A drawing part 87, which produces a navigation data as well as changing a display size, produces the drawing data to be displayed on the display device 10 or on a navigation data display area 66 (shown in FIGS. 8, 9) of the meter unit 50, based on display data and display color data that are stored in the HDD 21 and the like.

The HDD 21, which stores the display size, stores map data 21m that includes so-called map-matching data for the purpose of an accuracy improvement in position detection, and road data on a road juncture, in addition to the navigation program 21p. The map data 21m stores information on a network of roads as well as predetermined map image information for display purposes. The information on the network of the roads includes link information, node information and the like. The link information is information on predetermined sectional roads that constitute each road, and includes a position coordinate, a distance, time required, road width, the number of lanes, a speed limit and the like. The node information defines an intersection (a branch road) and the like, and includes the position coordinate, the number of right- and left-turn lanes, a link to a road to be joined, and the like. Juncture information between the links is set for data, such as the data on whether or not to allow traffic.

Also, the HDD 21 stores user data 21u, into which extra information on routing assistance, entertainment information and the user's own data can be written. Contents of the user data 21u can be rewritten through operations of the control switch group 7, the touch panel 22 and the remote control terminal 12, or through a voice input from the microphone 31. Additionally, the HDD 21 may include a database 21d, which stores data required for an operation of the navigation device 100, and information of various sorts.

Data addition and update can be performed on the map data 21m and the user data 21u via the map data entry device 6, using a storage medium 20. Although a CD-ROM, a DVD or the like is generally used as the storage medium 20 given a data volume of the storage medium 20, other media such as a memory card may be used as the storage medium 20. In addition, data used for the addition and the update of the map data 21m and the user data 21u may also be downloaded from an information center such as an Internet server via the external network.

The nonvolatile memory 9 includes a random access memory (RAM) such as the EEPROM and a flash memory. The nonvolatile memory 9 stores information and data that are required for the operation of the navigation device 100. The nonvolatile memory 9 is designed to retain memory contents even if an accessory switch of the vehicle falls into an off-state, that is, the navigation device 100 is turned off.

Besides, as an alternative to the nonvolatile memory 9, the HDD 21 may store the information and the data that are required for the operation of the navigation device 100. Moreover, the information and the data that are required for the operation of the navigation device 100 may be stored in the nonvolatile memory 9 and the HDD 21 separately.

The display device 10 is configured using a well-known color liquid crystal display, and includes the driver circuit (not shown) for the purpose of controlling a dot matrix LCD and an LCD. For instance, the active matrix drive system, which ensures that the target pixel is lit or extinguished by applying the transistor to each pixel, may be employed as the driver circuit, thereby performing display, on the basis of a display command and display screen data (navigation data) that have been produced in the control circuit 8. In addition, the organic EL indicator or the plasma indicator may be substituted for the display device 10.

The speaker 15 is connected to the well-known voice synthesis circuit 24, which is in turn connected to the I/O 84 of the control circuit 8. By a command of the navigation program 21p, digital voice data, which is stored in the nonvolatile memory 9 or in the HDD 21, is transformed into analog voice by the voice synthesis circuit 24, and the analog voice is emitted from the speaker 15. A recording and editing method, whereby a voice waveform that is directly accumulated or accumulated after encoding it is pieced together as required, for example, may be employed as a method for synthesizing voices. Besides, the speaker 52 of the meter unit 50 may be used as the speaker 15.

The speed sensor 23 includes a rotation detecting part such as a well-known rotary encoder. The speed sensor 23 is installed, for example, close to a wheel installation part in order to detect rotation of a wheel, and to input a result of this detection into the control circuit 8 as a pulse signal. In the control circuit 8, the number of revolutions of the vehicle wheel is converted into the vehicle speed, thereby calculating estimated arrival time from the present position of the vehicle to a destination, and an average vehicle speed according to each vehicle running section.

A LAN I/F 26 is an interface circuit to exchange data with the in-vehicle LAN 27. In addition, via the LAN I/F 26, the in-vehicle LAN 27 may capture data from the speed sensor 23, or may be connected to the in-vehicle ETC device 16.

By virtue of the above configuration, if the user chooses routing assistance processing from a menu displayed on the display device 10 through the operations of the control switch group 7, the touch panel 22 and the remote control terminal 12, or through the voice input from the microphone 31 in order to indicate a route to a destination on the display device 10 when the navigation program 21p is activated by the CPU 81 of the control circuit 8, the navigation device 100 performs the following processing.

First, the user chooses a certain point among arbitrary points on a map, points obtained as a result of retrieval of facilities and addresses, points registered by the user, and the like, and the user subsequently sets this point as his/her destination. The navigation device 100 obtains the present position of the vehicle by the position sensor 1, and obtains an optimal guidance route from the present position to the destination. Then, the guidance route is displayed on a road map on the display device 10 by adding the guidance route to the road map, thereby guiding the user to take an appropriate route. A Dijkstra method, for example, is known as the above method for automatically setting the optimal guidance route. The user is provided with guidance while operating the navigation device 100, and is informed of a message according to an operating state by means of at least one of the display device 10 and the speaker 15.

Figure 5:
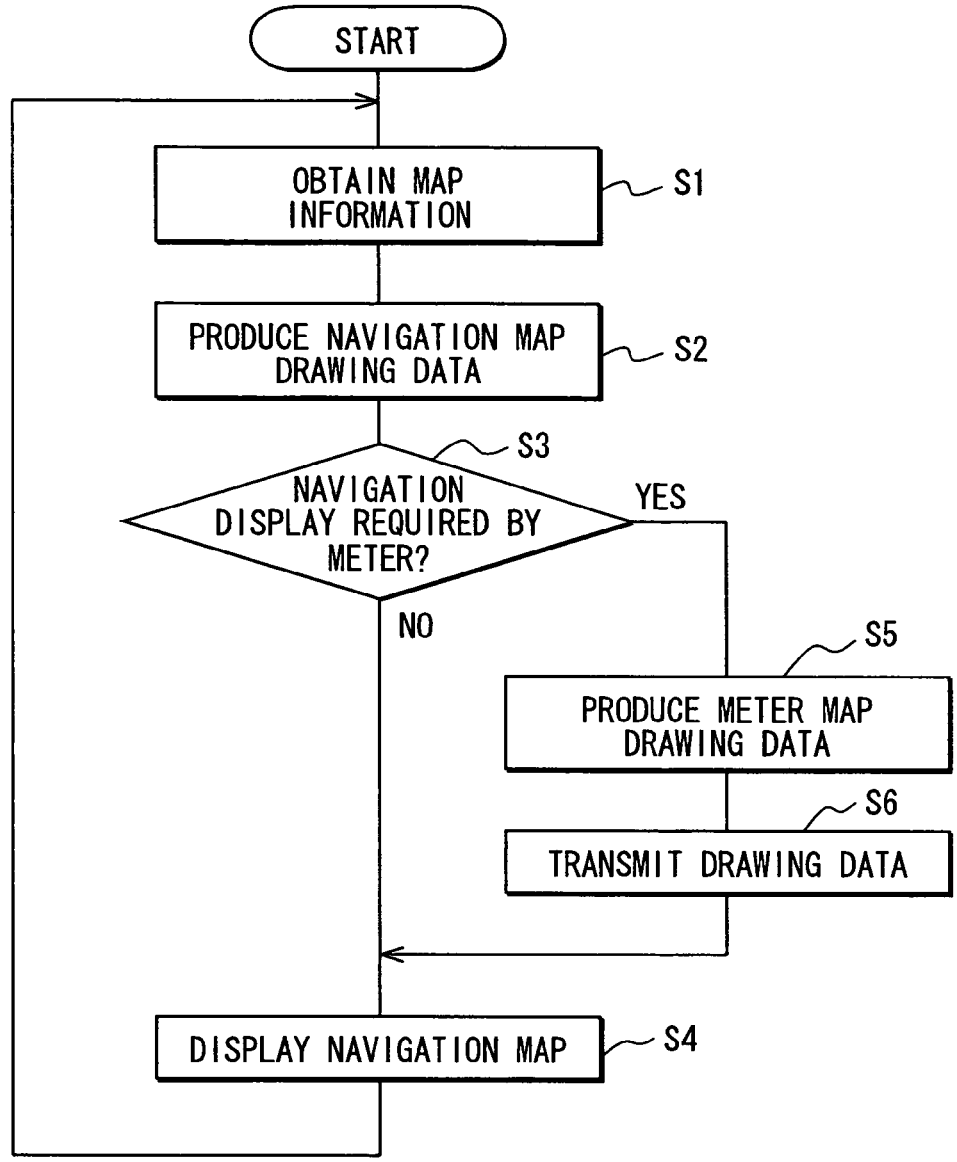
FIG. 5 is a flowchart showing display size change processing in an in-vehicle navigation device in the embodiment.

The navigation device 100, particularly the control circuit 8, performs display size change processing shown in FIG. 5 for the purpose of the display in the meter unit 50. The present processing is included in the navigation program 21p and is repeatedly performed with other programs than the navigation program 21p. Firstly, based on the present position of the vehicle detected by the position sensor 1, the map information on adjacencies to the present position of the vehicle is obtained (S1) from the map data 21m. Navigation map drawing data, which is used for the display on the display device 10 of the navigation device 100, is produced at step S2.

Secondly, whether or not METER in FIG. 5 (the meter ECU 40) requires navigation display (i.e., the navigation map drawing data) is determined. Data that has been inputted from the meter ECU 40 into the navigation device 100 via the in-vehicle LAN 27 is stored in a predetermined area of the RAM 83. Absence or presence of a navigation display request by the meter ECU 40 is indicated with a navigation display request flag, which is included in the data. If the navigation display is required, the navigation display request flag is set.

If the navigation display is required (S3: Yes), a meter display size table stored in the database 21d is referred to. Then, a display size of the navigation map drawing data produced at step S2 is converted into a different display size, which is to be displayed on the meter unit 50, thereby producing meter map drawing data (S5).

When information obtained from another in-vehicle control device via the in-vehicle LAN 27, and/or from an external device such as the VICS center 14 is given priority to be displayed over the navigation map drawing data produced at step S2, the navigation map drawing data is produced based on the above information. For instance, if the user is conducting a setting operation through the operation of the touch panel 22 or the remote control terminal 12, or through the voice input from the microphone 31, a setting screen used by the user becomes the navigation map drawing data.

Figures 6, 7:
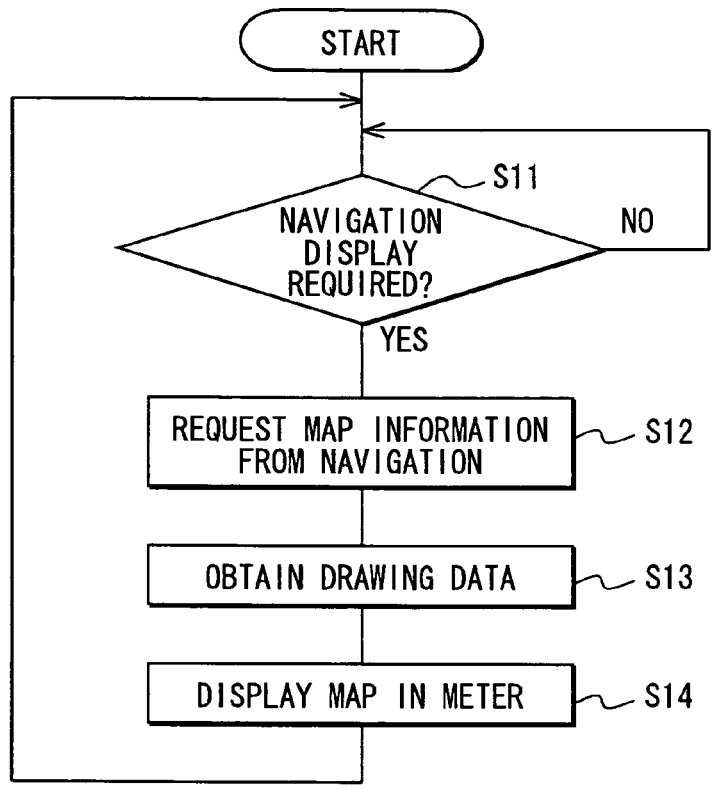
FIG. 6 is a flowchart showing drawing processing executed by a meter ECU in the embodiment.
FIG. 7 is an exemplary meter display size table in the embodiment.

In an exemplary meter display size table shown in FIG. 7, an ID number is assigned to each display item, and the display size is defined correspondingly. Criteria for the definition of the display size may be, for example, as follows:
(1) Make large the display size of the screen used for function settings, for the purpose of facilitation of the users setting operation.
(2) Make small the display size if the same information is displayed for a long time, since the user is unlikely to miss the information.
(3) Make large the display size of the information to be urgently recognized by the user.

In FIG. 7, the display sizes of a normal map display and a freeway mode are made small, because the information does not change considerably. In the freeway mode, various pieces of information are displayed while driving on a freeway. The display size of a menu screen is made large to facilitate the user's setting operation. In a double-screen mode, in which a main screen and a subscreen are simultaneously displayed, one of the screens is made medium-sized when displayed. In an intersection enlarged view, where a predetermined point is enlarged to be displayed, the display size is made large to make the user immediately aware of the information. Additionally, a degree of the enlargement is stored as an enlargement ratio.

The meter map drawing data that is produced is transmitted to the meter ECU 40 via the in-vehicle LAN 27 (S6) if the navigation display is required (S3: Yes). On the other hand, in the display device 10 of the navigation device 100, the navigation map drawing data produced at step S2 is displayed (S4) if the navigation display is not required (S3: No).

If the navigation display is not required (S3: No), the navigation map drawing data, which has been produced at step S2, is displayed in the display device 10 of the navigation device 100 (S4).

The above processing of FIG. 5 may be 'event initiated'. That is, when the navigation display is required by the meter ECU 40, the meter map drawing data is transmitted to the meter ECU 40. Instead of determining whether or not the navigation display is required (as a condition at S3), other methods may be alternatively employed. For instance, transmission to the meter ECU 40 may be performed with a predetermined timing (e.g., at a constant frequency).

Drawing processing is performed on meter display data as shown in FIG. 6. The present processing is included in the meter control program 41p and is repeatedly performed with other programs than the meter control program 41p. First, whether or not the navigation display is required in the meter unit 50 is determined. Then, if the navigation display is required (S11: Yes), the navigation display request, which requests the map information (i.e., the meter map drawing data), is transmitted to NAVIGATION (the navigation device 100) via the in-vehicle LAN 27 (S12).

Processing of steps S5, S6 (FIG. 5) is performed in the navigation device 100. The meter map drawing data, which has been produced and inputted into the meter ECU 40 as a result of steps S5, S6, is obtained by the drawing part 43 (S13). This meter map drawing data is combined with other drawing data such as those used for a speedometer, thereby producing the meter display data that is to be inputted into the meter unit 50. The meter unit 50 displays the meter display data, which has been inputted from the meter ECU 40 (S14).

Figure 8:
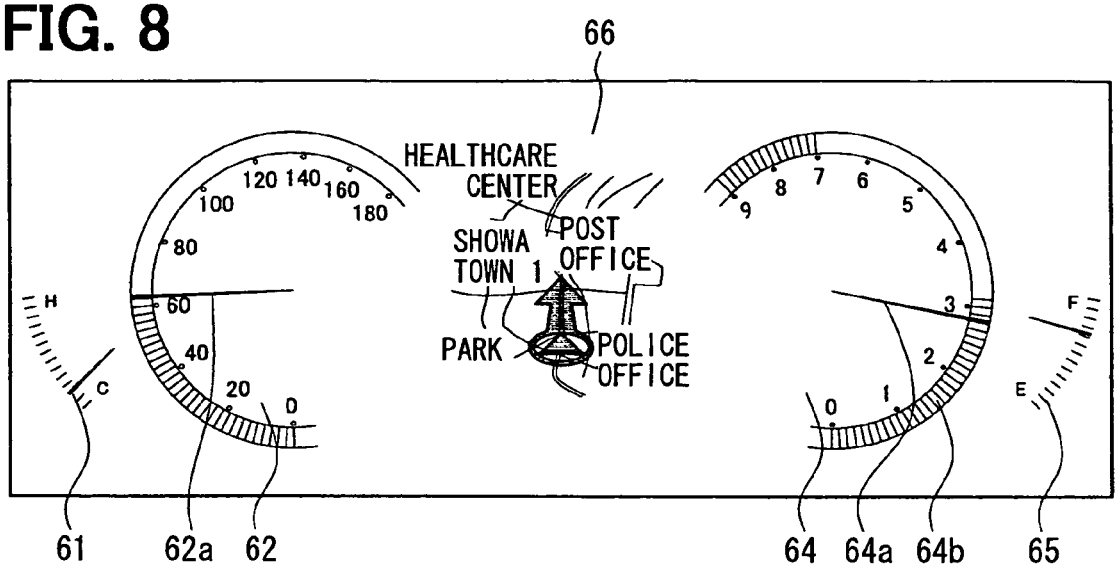
FIG. 8 is a schematic view showing an exemplary display of a meter, which employs the embodiment.
Figure 9:
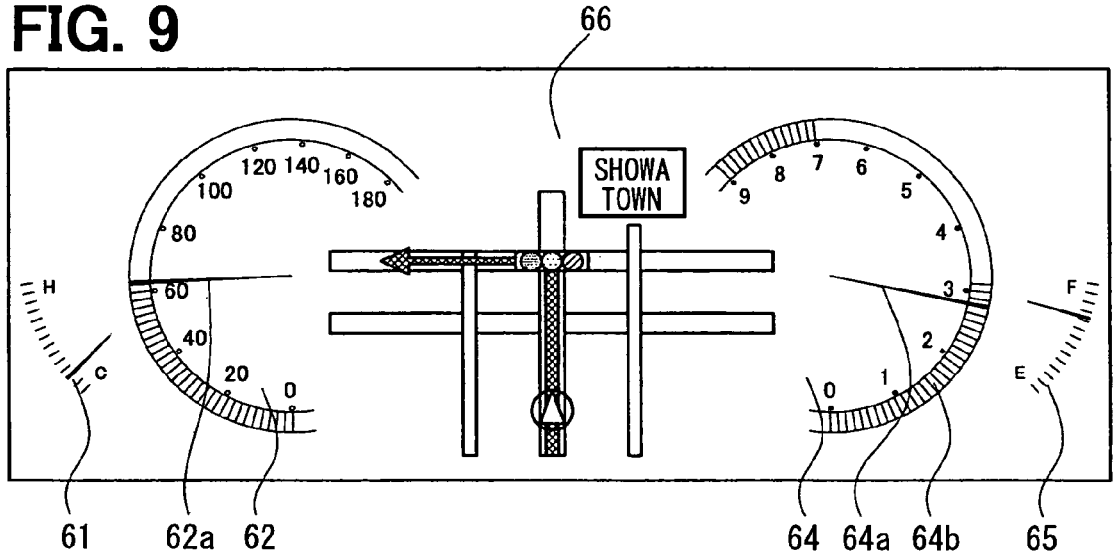
FIG. 9 is a schematic view showing another exemplary display of a meter, which employs the embodiment.

As shown in FIGS. 8, 9, the meter unit 50 includes a meter display area, a navigation data display area 66, and the like. The meter display area includes a water temperature display area 61, a speed display area 62, an engine speed display area 64, and a fuel level gauge display area 65. In FIG. 8 that illustrates a state of the normal map display, the display size is made small. A trip meter and the shift position may be displayed on the meter display area.

FIG. 9 illustrates a state of routing assistance, in which a driver is guided to turn left at the intersection. The display size is made large, so that the map is enlarged to occupy unused areas of the speed display area 62 and the engine speed display area 64.

When the meter map drawing data such as the map is enlarged to be displayed, the enlargement ratio or an enlargement range is determined, such that the enlarged display does not overlap with the meter display area (i.e., a display area except the navigation data display area 66). In FIG. 9, in which the map is enlarged to be displayed on the navigation data display area 66, if an engine speed increases, for example, it is possible that a meter pointer 64a of the engine speed display area 64 overlaps with a map display on the navigation data display area 66. In such a case, the meter map drawing data may be enlarged to be displayed on the navigation data display area 66 with a predetermined distance (e.g., the number of display dots) apart from an area where the meter displays such as the meter pointer 64a and a scale 64b are performed. The same is true with a meter pointer 62a of the speed display area 62.

At the engine speed display area 64, the map can be enlarged to be displayed up to an inner side of a number (0 (zero) to 9) arranged along the scale 64b, as long as the enlarged display does not overlap with the meter pointer 64a. As the meter pointer 64a moves from a position shown in FIG. 9 to a higher engine speed side of the scale 64b, a part of the map, which is located in an area that the meter pointer 64a approaches, gradually disappears. When the engine speed decreases, the meter pointer 64a moves back to the position shown in FIG. 9. Meanwhile, as the meter pointer 64a moves to a lower engine speed side of the scale 64b, the navigation data display area 66 becomes larger to display the map.

Figure 10:
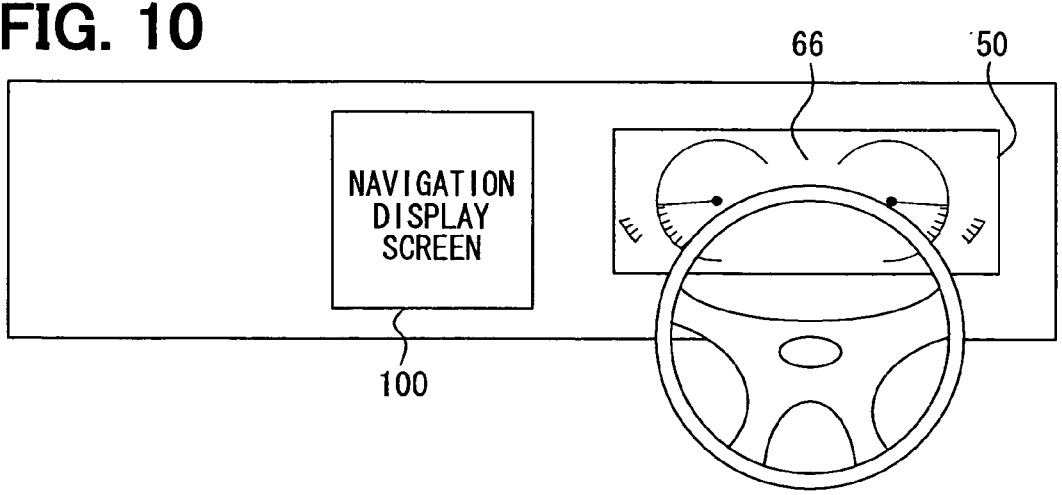
FIG. 10 is a schematic view showing an exemplary arrangement of a meter and an in-vehicle navigation device on an instrumental panel of a vehicle in the embodiment.

In the embodiment, both the meter unit 50 and the navigation device 100 may be provided on an instrumental panel of a vehicle as shown in FIG. 10. The navigation device 100, particularly a navigation display screen of the navigation device 100, is installed in the center of the instrumental panel.

A display data size displayed in the navigation display screen is changed into a new display data size, which is in turn displayed in the meter unit 50.

(First Modification)

The display size change processing may be performed in the meter ECU 40. To employ such a configuration, step S5 in FIG. 5 is not performed by the navigation program 21*p*, and the navigation map drawing data is directly transmitted to the meter ECU 40. Then, in the meter control program 41*p* after step S13 in FIG. 6, production (that corresponds to step S5 in FIG. 5) of the meter map drawing data is carried out, thereby changing the display size of the navigation map drawing data, and producing the meter map drawing data. The meter display size table is stored in the external memory 45.

(Second Modification)

Furthermore, the display size change processing may be performed both in the navigation device 100 and in the meter ECU 40. To employ such a configuration, in the meter control program 41*p* after step S13 in FIG. 6, the production (that corresponds to step S5 in FIG. 5) of the meter map drawing data (transmitting navigation data) is carried out. Then, the display size of meter map drawing data (the transmitting navigation data) (in which the display size has already been changed), which is transmitted from the navigation device 100, is changed again, thereby producing new meter map drawing data. The meter display size table is stored in the external memory 45 as well.

The display size change processing may be performed in the meter ECU 40. In the navigation device 100, in this case, the information obtained from another in-vehicle control device via the in-vehicle LAN 27 and/or from the external device such as the VICS center 14, and contents of the user's setting operation through the operation of the touch panel 22 or the remote control terminal 12, or through the voice input from the microphone 31, together with the navigation map drawing data, are transmitted to the meter ECU 40 when required. Additionally, in the meter ECU 40, the information may be obtained from another in-vehicle control device or the external device.

Thus far, the embodiments of the present invention have been described. However, they are no more than illustrations, and thus the present invention is not by any means limited to them. Various changes based on knowledge of those skilled in the art may be made without departing from the scope of the claims. For example, in the case of the user's input operation such as retrieval of the guidance route to the destination, the display size of the navigation data may be enlarged throughout the whole display area of the display device 10. Similarly, the display sizes of various menu screens on a navigation screen may be enlarged throughout the whole display area of the display device 10.

Additional advantages and modifications will readily occur to those skilled in the art. The invention in its broader terms is therefore not limited to the specific details, representative apparatus, and illustrative examples shown and described.

What is claimed is:

1. A vehicular display system comprising:
    an in-vehicle navigation device; and
    a vehicular meter device, wherein:
        the in-vehicle navigation device includes:
            a navigation data producing means for producing first data; and
            a transmitting means for transmitting intermediate data to the vehicular meter device, wherein:
                the intermediate data is one of the following data:
                    the first data;
                    second data; and
                    transmission navigation data;
        the vehicular meter device includes:
            a receiving means for receiving the intermediate data from the in-vehicle navigation device; and
            a navigation data display area for displaying the second data;
        at least one of the in-vehicle navigation device and the vehicular meter device includes a display size changing means for changing the first data into the second data, wherein,
            a display size of the first data is different from the display size of the second data; and
        the vehicular meter device includes the navigation data display area and a meter display area in the same display screen.

2. The vehicular display system according to claim 1, wherein:
    the display size changing means is included in the in-vehicle navigation device;
    the first data is navigation data;
    the second data is meter display navigation data; and
    the intermediate data is:
        transmitted to the vehicular meter device by the transmitting means; and
        received from the in-vehicle navigation device by the receiving means, wherein: the intermediate data is the second data.

3. The vehicular display system according to claim 1, wherein:
    the display size changing means is included in the vehicular meter device;
    the first data is navigation data;
    the second data is meter display navigation data; and
    the intermediate data is:
        transmitted to the vehicular meter device by the transmitting means; and
        received from the in-vehicle navigation device by the receiving means, wherein:
    the intermediate data is the first data.

4. The vehicular display system according to claim 1, wherein:
    the display size changing means is included in:
        the in-vehicle navigation device, wherein:
            the first data is navigation data; and
            the second data is the transmission navigation data; and
        the vehicular meter device, wherein:
            the first data is the transmission navigation data; and
            the second data is meter display navigation data; and
    the intermediate data is:
        transmitted to the vehicular meter device by the transmitting means; and
        received from the in-vehicle navigation device by the receiving means, wherein: the intermediate data is the transmission navigation data.

5. The vehicular display system according to claim 1, wherein the vehicular meter device includes an undisplayed area in the meter display area as the navigation data display area.

6. The vehicular display system according to claim 1, wherein the vehicular meter device excludes an undisplayed area in the meter display area, which is used for a meter display, form the navigation data display area.

7. The vehicular display system according to claim 1, further comprising: a position detecting means for detecting a present position of a vehicle, wherein: the display size changing means changes the display size of the first data according to the present position of the vehicle, which is detected by the position detecting means.

8. The vehicular display system according to claim 1, further comprising:
an input operating means for performing an input operation on the in-vehicle navigation device; and
an input operation detecting means for detecting the input operation, wherein: the display size changing means changes the display size of the first data according to the input operation, which is detected by the input operation detecting means.

9. The vehicular display system according to claim 1, further comprising:
an external information obtaining means for obtaining information from an external device, wherein: the display size changing means changes the display size of the first data according to the information, which is obtained by the external information obtaining means.

10. The vehicular display system according to claim 1, wherein the display size changing means changes the display size of the first data according to display contents of the first data.

11. The vehicular display system according to claim 1, further comprising:
a display size storing means for storing:
a condition under which the display size of the first data is changed; and
display size changing data, wherein: the display size changing means changes the display size of the first data based on contents stored by the display size storing means.

12. A vehicular meter device comprising:
a meter;
a receiving means for receiving first data from an output medium; and
a display size changing means for changing the first data into second data when a predetermined size changing condition is set, wherein:
the meter further includes:
a vehicle speed display area;
an engine speed display area; and
a navigation data display area for displaying either one of the first data and the second data, wherein: the second data is displayed with a different size from the first data in the navigation data display area.

13. A method for displaying travel guidance information in a vehicle that has a navigation system and a meter display device, the method comprising:
producing first data in the navigation system;
changing the produced first data into second data, a display size of which is different from the display size of the first data, when a predetermined size changing condition is set; and
displaying the travel guidance information in the meter display device based on either one of the first data and the second data.

14. The method according to claim 13, wherein: the changing employs a pre-stored table, whereby the display size of an item to be displayed is determined.

15. The method according to claim 14, wherein: the item of the pre-stored table includes:
a display for a function setting;
information displayed over a prolonged period of time; and
information that is to be urgently recognized by a user.

16. A vehicular display system comprising:
an in-vehicle navigation device; and
a vehicular meter device, wherein:
the in-vehicle navigation device includes:
a navigation data producing means for producing first data; and
a transmitting means for transmitting intermediate data to the vehicular meter device, wherein:
the intermediate data is one of the following data:
the first data;
second data; and
transmission navigation data;
the vehicular meter device includes:
a receiving means for receiving the intermediate data from the in-vehicle navigation device; and
a navigation data display area for displaying the second data;
at least one of the in-vehicle navigation device and the vehicular meter device includes a display size changing means for changing the first data into the second data, wherein:
a display size of the first data is different from the display size of the second data; and
a position detecting means for detecting a present position of a vehicle, wherein:
the display size changing means changes the display size of the first data according to the present position of the vehicle, which is detected by the position detecting means.

17. A vehicular display system comprising:
an in-vehicle navigation device; and
a vehicular meter device, wherein:
the in-vehicle navigation device includes:
a navigation data producing means for producing first data; and
a transmitting means for transmitting intermediate data to the vehicular meter device, wherein:
the intermediate data is one of the following data:
the first data;
second data; and
transmission navigation data;
the vehicular meter device includes:
a receiving means for receiving the intermediate data from the in-vehicle navigation device; and
a navigation data display area for displaying the second data;
at least one of the in-vehicle navigation device and the vehicular meter device includes a display size changing means for changing the first data into the second data, wherein:
a display size of the first data is different from the display size of the second data; and
a display size storing means for storing:
a condition under which the display size of the first data is changed; and
display size changing data, wherein: the display size changing means changes the display size of the first data based on contents stored by the display size storing means.

* * * * *